United States Patent
Shiitani et al.

(10) Patent No.: US 6,545,673 B1
(45) Date of Patent: Apr. 8, 2003

(54) THREE-DIMENSIONAL CG MODEL GENERATOR AND RECORDING MEDIUM STORING PROCESSING PROGRAM THEREOF

(75) Inventors: Shuichi Shiitani, Kanagawa (JP); Masaki Watanabe, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/447,053

(22) Filed: Nov. 23, 1999

(30) Foreign Application Priority Data

Mar. 8, 1999 (JP) .......................................... 11-059950

(51) Int. Cl.[7] ................................................ G06T 1/00
(52) U.S. Cl. ...................... 345/418; 345/419; 345/473; 345/474; 382/285
(58) Field of Search ............................... 345/418–419, 345/424, 426, 443, 474, 420, 473; 382/154, 285

(56) References Cited

U.S. PATENT DOCUMENTS 5,818,439 A * 10/1998 Nagasaka et al. ........... 345/327
6,342,887 B1 * 1/2002 Munroe ...................... 345/426
6,373,492 B1 * 4/2002 Kroitor ....................... 345/473
6,373,977 B1 * 4/2002 Culbertson .................. 382/154

FOREIGN PATENT DOCUMENTS

JP    10-172009    6/1998

* cited by examiner

*Primary Examiner*—Mark Zimmerman
*Assistant Examiner*—Lance W. Sealey
(74) *Attorney, Agent, or Firm*—Staas & Halsey LLP

(57) ABSTRACT

The present invention provides a three-dimensional CG model generator allowing input assistance for matching a supplied actually captured image and a basic model to be simplified so that a three-dimensional CG model can be generated without special skills. An actually captured image is input from an image inputting part, and an image displaying part displays the input image on a display. A pose information designating part designates a pose by designating the positions of the vertexes and the edges connecting the vertexes of the object represented in the actually captured image. A pose matching part performs pose matching by comparing the designated pose and the basic pose registered in the basic pose information storing part. An automatic fitting part performs fine adjustment of the length of the edge, the angle of the vertexes, the torsion relationship or the like, based on the geometry and the pose, and a texture image extracted from the actually captured image by a texture processing part is attached so that a three-dimensional CG model is generated.

10 Claims, 13 Drawing Sheets

(a)   ACTUALLY CAPTURED IMAGE (b)

DESIGNATION OF VERTICES
AND EDGES (a) DESIGNATION OF A POSE (b)

DESIGNATION OF A POSE

THREE-DIMENSIONAL CG MODEL GENERATOR AND RECORDING MEDIUM STORING PROCESSING PROGRAM THEREOF

BACKGROUND OF THE INVENTION

1. Field of the Invention

The present invention relates to a technique for generating a three-dimensional computer graphics (hereinafter, abbreviated as "CG") model from an object in the real world represented in an actually shot image so that the object is reproduced in a virtual world.

2. Description of the Related Art

With recent high performance of computer systems and development of multimedia processing techniques, an environment where advanced three-dimensional computer graphics can be processed is emerging, and accelerator boards dedicated to three-dimensional graphics processing are being provided. With improvement of graphics processing capability, a virtual reality system such as a walk-through system that handles three-dimensional CG models built in a computer system is in increasing demand. In the case where a three-dimensional object is displayed in this virtual reality system, it is difficult to reproduce a three-dimensional CG model artificially created by animators so as to look as realistic as a real thing in the real world. Therefore, the approach of capturing an object in the real world and reproducing it naturally in a virtual space so as to create a more natural three-dimensional object is under development. In other words, a method for generating a three-dimensional CG model by taking an actually captured image into a computer and processing the captured image with an image processing technique is under development.

A three-dimensional CG model of an object represented in an actually captured image cannot entirely be generated by automatic processing, as far as the current image processing technique is concerned. It is necessary for the user to perform manual input assistance. In the prior art, there are various methods for input assistance.

A first method, most generally, is as follows. A plurality of images are prepared by photographing an object from various viewpoints, and the same part of the object in these images is specified as a corresponding part. Generally, this is referred to as a stereo method.

However, in the first method, it is difficult to specify the corresponding points fully automatically. In addition, when there are a large number of corresponding points, it is troublesome for the user to specify the corresponding points manually.

A second method for creating a model is as follows. A previously prepared basic model is superimposed on an actually captured image, and the basic model is manipulated for modification and adjustment so as to take on the same posture as that of the object represented in the actually captured image. A desired CG model can be obtained by this basic model manipulation.

However, in the second method, manipulation such as movement or rotation is required in order that the model takes on the same posture as that of the object represented in the actually captured image. This manipulation requires skills.

The approach of matching a model to an object represented in an actually captured image automatically has been researched. However, it is necessary to prepare an initial state where the object in the actually captured image and the basic geometric model have the same posture to some extent before automatic operation. Therefore, although automatic operation is used for the final fine adjustment of the input by the first and second methods, the problems described above in conjunction with the first and second methods are still to be solved.

SUMMARY OF THE INVENTION

Therefore, with the foregoing in mind, it is an object of the present invention to provide a three-dimensional CG model generator that allows the input assistance by the user for matching between an actually captured image supplied thereto and a basic model to be simplified and can generate a three-dimensional CG model without special skills.

Furthermore, it is another object of the present invention to provide a three-dimensional CG model generator that can generate a three-dimensional CG model that represents the supplied actually captured image more precisely.

Furthermore, it is another object of the present invention to provide processing steps for realizing the three-dimensional CG model generator of the present invention using a computer in the form of a computer-readable recording medium.

In order to achieve the above objects, a three-dimensional CG model generator of the present invention is an apparatus for generating a three-dimensional CG model of a three-dimensional object represented in a two-dimensional image, based on information from the two-dimensional image representing the three-dimensional object supplied thereto, includes an image inputting part for receiving image data of the object taken from a certain viewpoint; a basic pose information storing part for storing pose information on all patterns of a basic geometric model as basic pose information, the pose information indicating a pose with relationships of vertexes and edges of the image; a pose information designating part for acquiring the pose information by designating a vertex and an edge of the object represented in the supplied image; a pose matching part for performing pose matching by comparing the pose information acquired by the pose information designating part and the basic pose information stored in the basic pose information storing part, and specifying a basic geometric model having corresponding pose information and a corresponding pose; and an automatic fitting part for deforming and adjusting the pose of the basic geometric model specified by the pose matching part so as to conform to the pose of the supplied image. The three-dimensional CG model of the object is generated based on the pose information of the supplied image.

With this embodiment, the characteristics of the object in the supplied actually captured image can be extracted using information on basic elements of a vertex and an edge and information on the correlation between these elements as pose information, and a corresponding basic geometric model can be selected by pose matching with the basic geometric model.

Next, it is preferable that the three-dimensional CG model generator of the present invention includes a pose matching history information storing part for storing history information of the results of the past pose matching, and that the basic geometric model candidate displaying and selecting part displays a plurality of candidates with priorities that are assigned based on the pose matching history information when the plurality of candidates are displayed.

This embodiment allows the three-dimensional CG model generator to include a learning function. Therefore, even if a plurality of candidates are obtained as a result of pose matching, the candidates with priorities that are assigned based on the past history can be presented to the user, so that the selection process by the user can be simplified.

Herein, the priorities can be assigned, for example based on how many times the candidate is selected as a matched basic geometric model in the past, or based on how recent the candidate was last selected as a basic geometric model (least recent used).

Next, it is preferable that in the process of designating vertexes and edges of the supplied image sequentially by inputting the vertexes and the edge from the pose information designating part, the pose matching part includes a partial pose matching part for finding a match between information on a portion of a pose of the basic geometric model stored in the basic pose information storing part and information based on a portion of a pose that is constituted by the designated and input vertexes and edges; and a basic geometric model candidate displaying and selecting part for presenting a corresponding basic geometric model obtained as a result of the partial pose matching by the partial pose matching part. It is preferable that the results of the partial pose matching are updated and presented in response to information on a vertex and an edge of the supplied image being input from the pose information designating part.

This embodiments makes it possible to perform partial pose matching based on the partial pose information, which is the pose information on an already input portion of the entire pose, every time information on a vertex or an edge is input in the process of sequentially designating the vertexes and the edges of the image supplied by the user from the pose information designating part, and to present dynamically the candidates of the basic geometric model in the range that can be limited at the point.

Next, it is preferable that the three-dimensional CG model generator further includes a basic pose extracting part for receiving a three-dimensional CG model as a basic geometric model, generating a two-dimensional image of the basic geometric model which is a projected image from one viewpoint, extracting pose information from the two-dimensional image, changing the viewpoint, repeating the extraction of the pose information so that all patterns of poses that the basic geometric model can take are extracted.

With this embodiment, the basic pose information to be registered in the basic pose information storing part can be generated automatically.

Furthermore, the three-dimensional CG model generator of the present invention can be configured by a computer based platform by installing a processing program that can provide processing steps for realizing the above-mentioned three-dimensional CG model generator of the present invention.

These and other advantages of the present invention will become apparent to those skilled in the art upon reading and understanding the following detailed description with reference to the accompanying figures.

DESCRIPTION OF THE PREFERRED EMBODIMENTS

Hereinafter, the embodiments of the three-dimensional CG model generator of the present invention will be described with reference to the accompanying drawings. First, the basic principle of the present invention will be described, and then the examples of the apparatus configuration will be described.

First, the basic principle of the present invention will be described.

Figure 1:
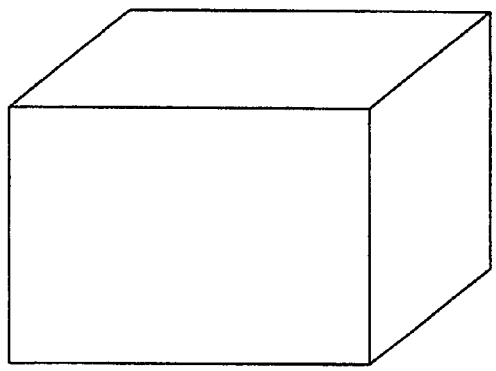
FIG. 1(*a*) is a diagram showing an example of an actually captured image of an object used in a three-dimensional CG model generator of the present invention, and FIG. 1(*b*) is a diagram showing an example of the designation of vertexes and edges based on the actually captured image.
Figure 1:
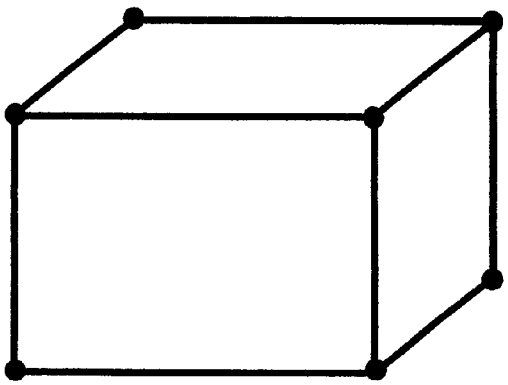

For the three-dimensional CG model generator of the present invention, an object from which a three-dimensional CG model is generated is captured with a camera or a video camera. Then, the captured image is supplied to the generator and converted to be digital data as a three-dimensional CG model. FIG. 1(*a*) is an example of an actually captured image obtained by a camera. An image of hexahedron (rectangular solid) is taken as an example. One image may be sufficient, but preferably, the object is captured obliquely so that the characteristics of the object as a solid body can be distinguishable. Moreover, if a plurality of images of the object captured from a plurality of directions are prepared, a more precise three-dimensional CG model can be created more easily.

The characteristics of the object are extracted from the actually captured image that has been supplied to the generator. In the present invention, pose information is utilized. Herein, "pose" refers to how an object looks, and information indicating the position relationship of the vertexes and the edges of the object is extracted as pose information. FIG. 1(*b*) is a diagram showing the state where the vertexes and edges of the object are designated based on the actually captured image shown in FIG. 1(*a*). When a starting point and an ending point of an edge are very close in the image, the points may be regarded as one point so that a plurality of edges can be extended from one vertex. As shown in FIG. 1(*b*), the image of FIG. 1(*a*) has seven vertexes and nine edges, and the relationships of the vertexes and the edges are extracted as those shown in FIG. 1(b).

The extraction of the pose information may be performed automatically by software processing by using an image processing technique such as edge enhancement. However, herein, a method by manual designation of the user will be described. An actually captured image as shown in FIG. 1(a) is displayed on a display, which is an interface to the user of the apparatus. The user points at vertexes or edges of the object in the image with a pointing device such as a mouse or a digitizer, so as to designate a pose. For example, the actually captured image is displayed in the background as a base image, and vertexes of the object in the actually captured image are designated and edges are traced along in such a manner as a diagram is being drawn with a two-dimensional drawing tool. This drawing provides information as to where vertexes are positioned in the actually captured image and which vertexes each of the edges connects.

Figure 2:
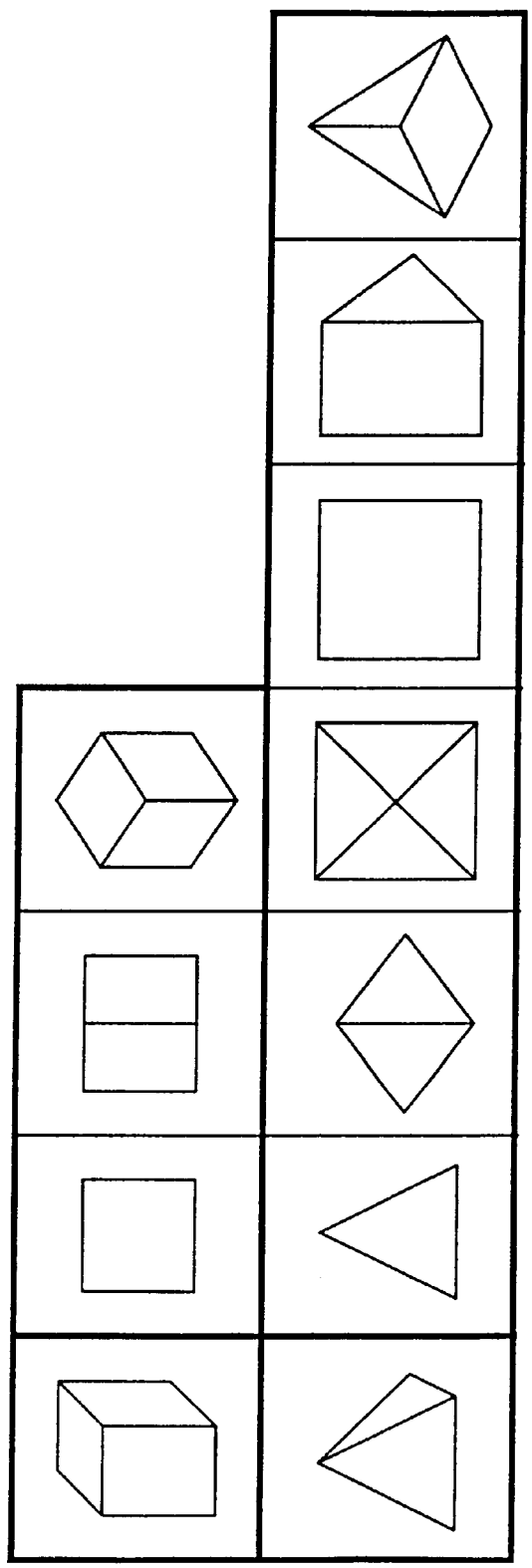
FIG. 2 is a diagram showing an example of pose information of a basic geometric model used in the three-dimensional CG model generator of the present invention.

Next, using the thus obtained pose information as a clue, a matched model is selected among the base geometric models that have been previously registered and stored in the three-dimensional CG model generator. For this operation, the pose information of all the patterns of the basic geometric models has been stored as basic pose information in a basic pose information storing part. Herein, "all the patterns of the pose information" means all the variations of the pose information that can be derived from the object viewed from various viewpoints. FIG. 2 shows the basic pose information in the case where a rectangular solid and a quadrangular pyramid are taken as the basic geometric model, for example. The example of the rectangular solid is shown in the upper row in FIG. 2, and the example of the quadrangular pyramid is shown in the lower row. What is shown in the far left box is the index, and the name of the basic geometric model such as "rectangular solid" or "quadrangular pyramid" may be displayed therein. Alternatively, a geometric figure well indicating the characteristics of the object may be displayed as a symbol. Variations of the pose information of the object are arranged on the right of the index. There are four variations of the basic pose information with respect to the rectangular solid, and there are seven variations of the basic pose information with respect to the quadrangular pyramid. When a piece of pose information is the same as another piece of pose information, they are classified into the same variation even if they are taken from different viewpoints. It is preferable to display a typical image from a typical viewpoint of each pose information on the display, as shown in FIG. 2, so that the user can visually recognize the image without any difficulty.

Next, matching of a pose is performed. Pose matching is performed using the number of vertexes, the position relationship, the number of edges and the like. In the case of the example of FIG. 1, as a result of pose matching based on the facts that there are seven vertexes, there are nine edges, and how the vertexes and the edges are connected, the object in the actually captured image corresponds to the pose on the far right of the rectangular solid of the basic geometric model.

Next, the object in the actually captured image is related to the basic geometric model together with the pose by specifying their corresponding points. In order to do this, it is determined which vertex of the basic model a vertex of the actually captured image corresponds to. This determination is performed utilizing the relationships of the vertexes and the edges. In the image, two edges are connected to the uppermost vertex in the image of FIG. 1(b). There are three vertexes at which two edges are connected in this pose, and one of them is provisionally determined as a corresponding point. Then, the opposite vertexes of the edge are attempted to be linked one after another. When the linkage fails, this means that the provisional determination of the corresponding point is erroneous, so that the operation is repeated from the beginning. In this manner, matching is performed in a trial and error manner until a pattern that satisfies all the relationships of the vertexes and the edges can be found.

Figure 3:
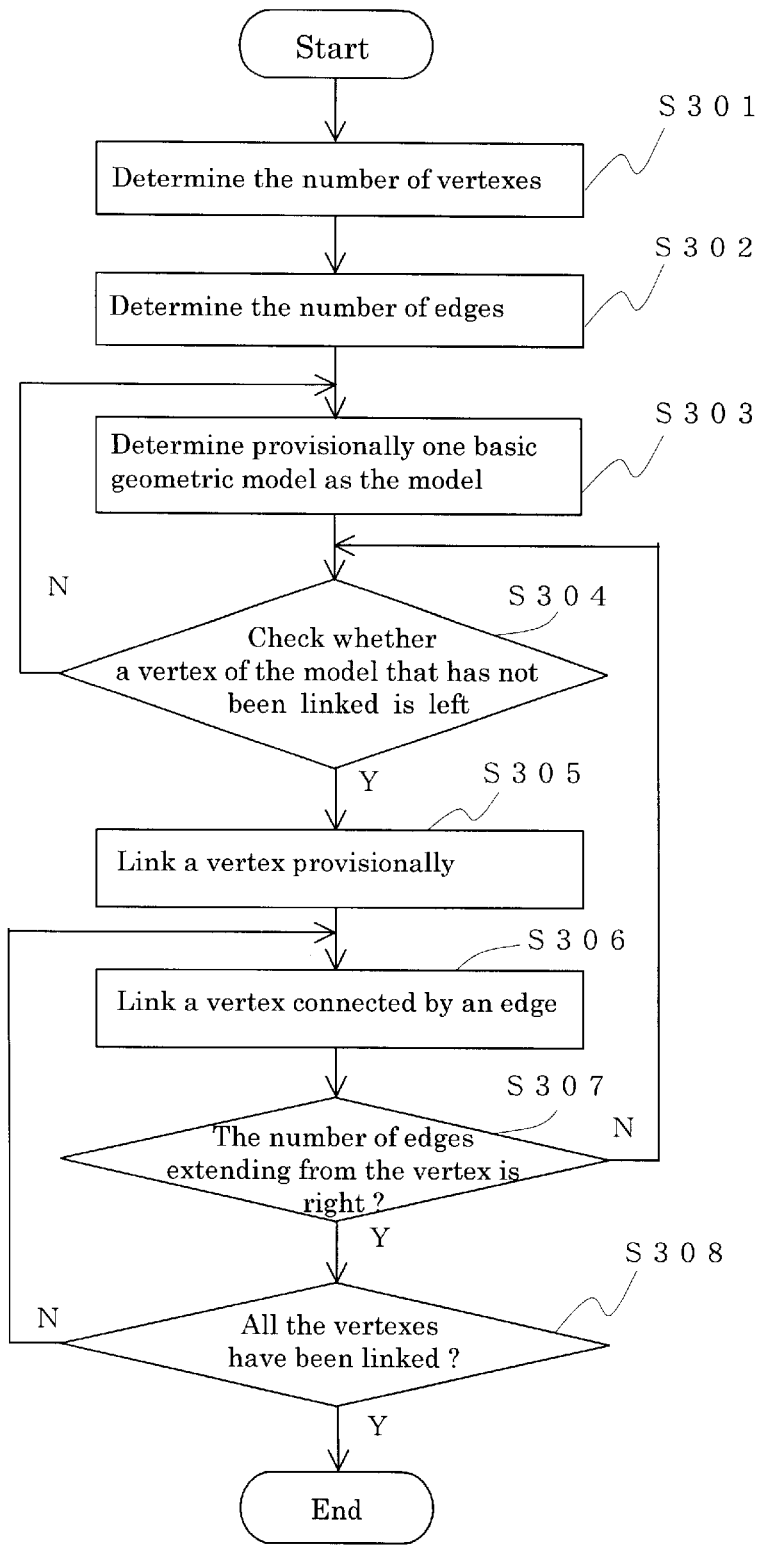
FIG. 3 is a flow chart of a process for matching poses and a process for linking corresponding vertexes, which are primarily performed by a pose matching part 70 of the present invention.

FIG. 3 shows a flow chart of a process for matching poses and a process for linking corresponding vertexes, which are primarily performed by a pose matching part 70.

First, the number of vertexes extracted from the actually captured image is determined (step S301). Next, the number of edges extracted from the actually captured image is determined (step S302). A model having a corresponding number of vertexes and a corresponding number of edges is selected among the basic geometric models stored in a basic pose information storing part 60 and provisionally determined as the model (step S303).

The process for linking the vertexes of the provisionally determined model to the vertexes of the actually captured image is performed in order to specify a model having a matched connection relationship of all the vertexes and the edges. First, it is checked whether or not there is any vertex of the provisionally determined model that has not been linked to a vertex of the actually captured image yet (step S304). In the case where there is no vertex left that has not been linked to a vertex of the actually captured image yet (step S304: N), this means that there is no pattern that matches the actually captured image in the relationship of the vertexes and the edges. In other words, the provisionally determined model is erroneous, so that the procedure returns to the step of provisionally determining a model (step S303).

In the case where there is at least one vertex left that has not been linked yet (step S304: Y), one vertex of the provisionally determined model is provisionally linked to one vertex of the pose extracted from the actually captured image (step S305).

Next, the vertex connected to the linked vertex by an edge is linked to a vertex of the actually captured image (step S306), and the numbers of edges extended from these vertexes are detected (step S307).

In the case where the numbers of edges are not matched in step S307 (step S307: N), this means that this provisional linkage of the vertexes in step S305 is erroneous. Therefore, it is necessary to select another vertex for provisional linkage. First, the procedure returns to step S304, and it is checked whether or not there is still a vertex that has not been provisionally linked yet. In the case where there is still an unlinked vertex (step S304: Y), the procedure proceeds with step S305 and the subsequent steps so that the provisional linkage is performed again with respect to the remaining vertex. In the case where there is no vertex that has not been subjected to the provisional linkage yet (step S304: N), this means that the provisional linkage has failed with respect to all the vertexes of the basic geometric model. In other words, the provisional determination of the basic geometric model in step S303 is erroneous. Therefore, returning to step S303, the operation is repeated starting from the provisional determination of the basic geometric model.

In the case where the numbers of edges are matched in step S307 (step S307: Y), it is checked whether or not all the vertexes have been linked (step S308). When there is any vertex left that has not been linked yet (step S308: N), steps S306 to S307 are repeated. When all the vertexes are completed to be linked (step S308: Y), the process ends.

Next, when the pose and the vertexes are linked to corresponding pose and vertexes, automatic fitting is performed. The poses of models stored in the basic pose information storing part are utilized for automatic fitting. In the automatic fitting process, the length of an edge, the angle between a vertex and edges, the torsion relationship and the like are subjected to fine adjustment so that the model matches the object in the actually captured image in the stereoscopic geometry. After this automatic fitting is performed, the resultant basic geometric model is superimposed on the actually captured image and displayed. If the automatic fitting has been successful, the model is displayed with the same pose as that of the object in the actually captured image.

Thereafter, a texture is attached so that a three-dimensional CG model is completed.

Above described is the basic principle of the three-dimensional CG model generator of the present invention.

Next, the examples of the apparatus configurations will be described as specific embodiments of the present invention.

Embodiment 1

An example of an apparatus configuration of the present invention will be described as Embodiment 1.

Figure 4:
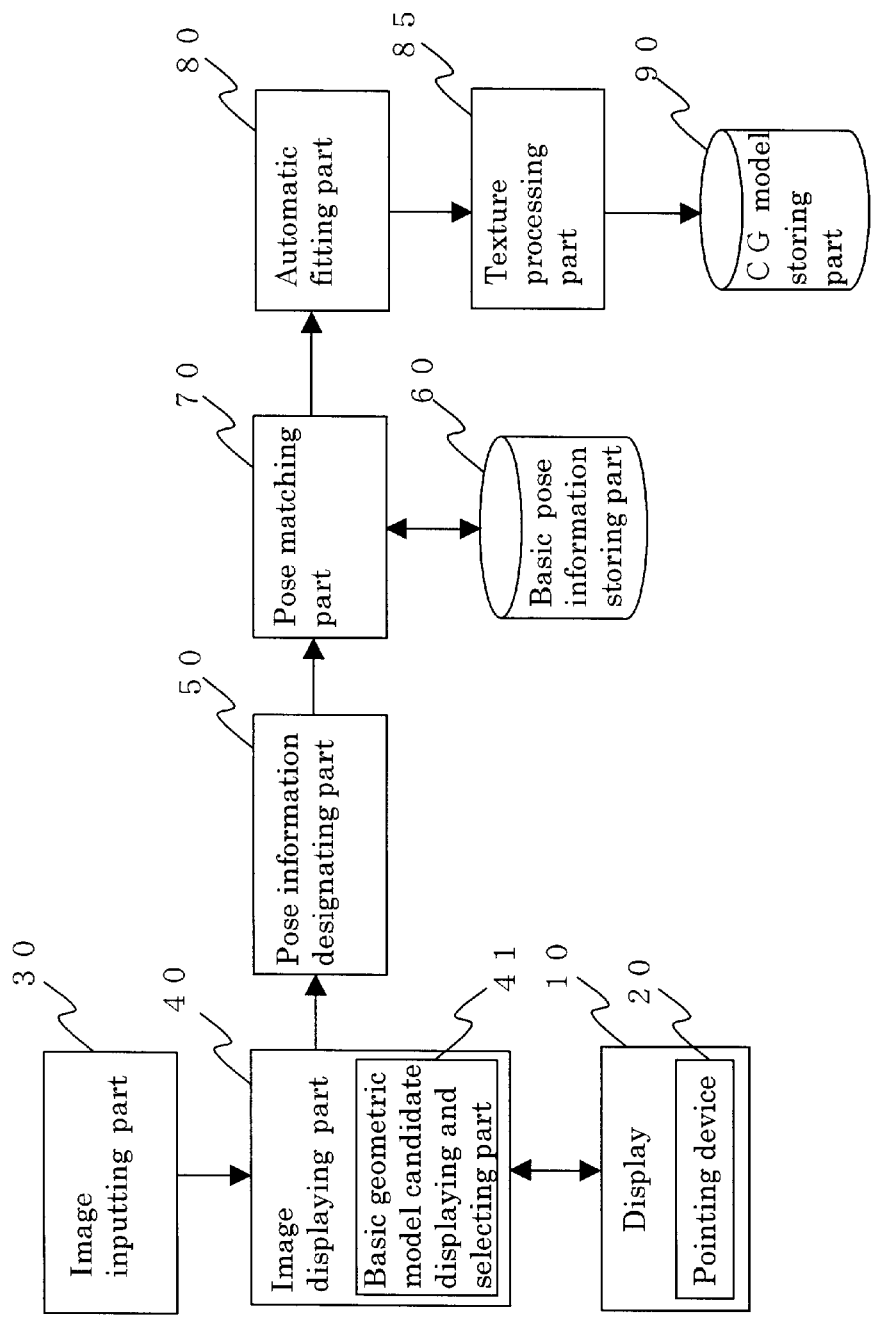
FIG. 4 is a block diagram showing a schematic apparatus configuration of Embodiment 1 of the present invention.

FIG. 4 is a block diagram showing the schematic apparatus configuration of Embodiment 1.

In FIG. 4, number 10 denotes a display for displaying an actually captured image or a pose inputted by the user. Number 20 denotes a pointing device for designating a position on an image or the like. Number 30 denotes an image inputting part for receiving a digital image captured by a camera or a video camera. Number 40 denotes an image displaying part for providing an interface with the user that also serves as a basic geometric model candidate displaying and selecting part. An actually captured image supplied from the image inputting part 30 is displayed on the display 10.

Number 50 denotes a pose information designating part to which the user designates a vertex or an edge of the object in the actually captured image displayed on the display 10 with the pointing device 20 so that the pose of the object in the actually captured image is input. The inputted designation information is the vertexes of the object that can be seen and which vertexes are connected by the edges that can be seen.

Number 60 denotes a basic pose information storing part for storing various pose information of each basic geometric model as basic pose information.

Number 70 denotes a pose matching part for performing the matching between the pose obtained from the object in the supplied actually captured image by the designation by the pose information designating part 50 and the basic pose information stored in the base pose information storing part.

Number 80 denotes an automatic fitting part for performing automatic fitting by using the basic geometric model and the pose determined by the pose matching part 70 as the initial value.

Number 85 denotes a texture processing part, which extracts a texture from the supplied actually captured image and attaches the texture on the surface of the three-dimensional CG model that has been subjected to the automatic fitting so as to complete the three-dimensional CG model.

Number 90 denotes a three-dimensional CG model storing part for storing the three-dimensional CG model generated from the actually captured image.

Although the apparatus of the present invention includes general system resources such as a control part necessary to control the entire apparatus, a memory and a device driver, the descriptions of those elements are omitted for brief explanation herein.

Figure 5:
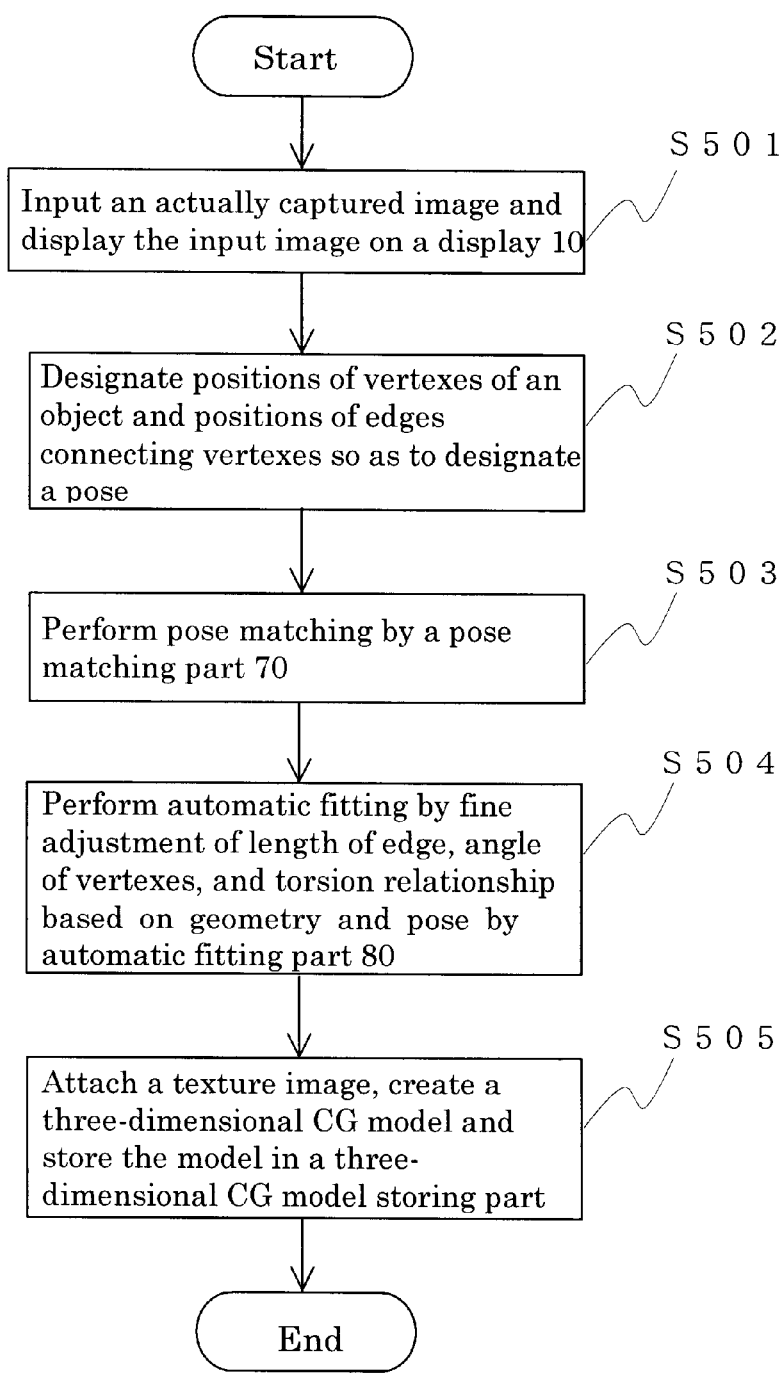
FIG. 5 is a flow chart showing the outline of the processes of the three-dimensional CG model generator of the present invention.

FIG. 5 is a flow chart showing the outline of the processes of the three-dimensional CG model generator of the present invention.

First, an actually captured image of an object from which the user is to generate a model is prepared, and the image is input from the image inputting part 30. The image displaying part 40 displays the input image on the display 10 (step S501).

Next, in the pose information designating part 50, the user designates the pose information by designating the positions of the vertexes and the positions of the edges connecting the vertexes of the object in the actually captured image with the pointing device 20 (step S502).

Next, the pose matching 70 performs pose matching between the designated pose and the basic pose registered in the basic pose information storing part 60 (step S503).

Next, the basic model retrieved by the pose matching is adjusted so as to conform to the object in the actually captured image. The automatic fitting part 80 performs automatic fitting by performing fine adjustment of the length of the edge, the angle between the vertex and the edges, the torsion relationship and the like based on the geometry and the pose (step S504). Thus, the retrieved basic model is modified or moved so as to match with the vertexes designated by the user.

Finally, the texture image extracted from the actually captured image is attached so that a three-dimensional CG model is generated. The generated three-dimensional CG model is stored in the three-dimensional CG model storing part 90 (step S505).

Thus, the three-dimensional CG model generator of the present invention allows the input assistance by the user for matching between the supplied actually captured image and the basic model to be simplified so that a three-dimensional CG model can be generated without special skills.

Embodiment 2

Embodiment 2 shows an example of an apparatus configuration of the present invention. Embodiment 2 assists pose matching by inputting an attribute of an object in an actually captured image. In the example in the description of the basic principle of the present invention, a corresponding pose is retrieved among the poses of a rectangular solid and a quadrangular pyramid by matching the poses. In the example, such two types of basic models are used. However, if there are a considerable number of basic models, the matching process takes a long time. In addition, a plurality of poses become candidates so that the backtrack increases. Therefore, an attribute designating part is prepared, and an attribute of the object in the actually captured image is input so that a corresponding basic model is previously designated, thereby reducing the time required for the pose matching process and the backtrack process. For designation of an attribute, for example, what the geometry is called, such as "rectangular solid" and "quadrangular pyramid", can be designated. Alternatively, a list of symbols indicating basic models is displayed so that a corresponding model can be selected from the list.

Figure 6:
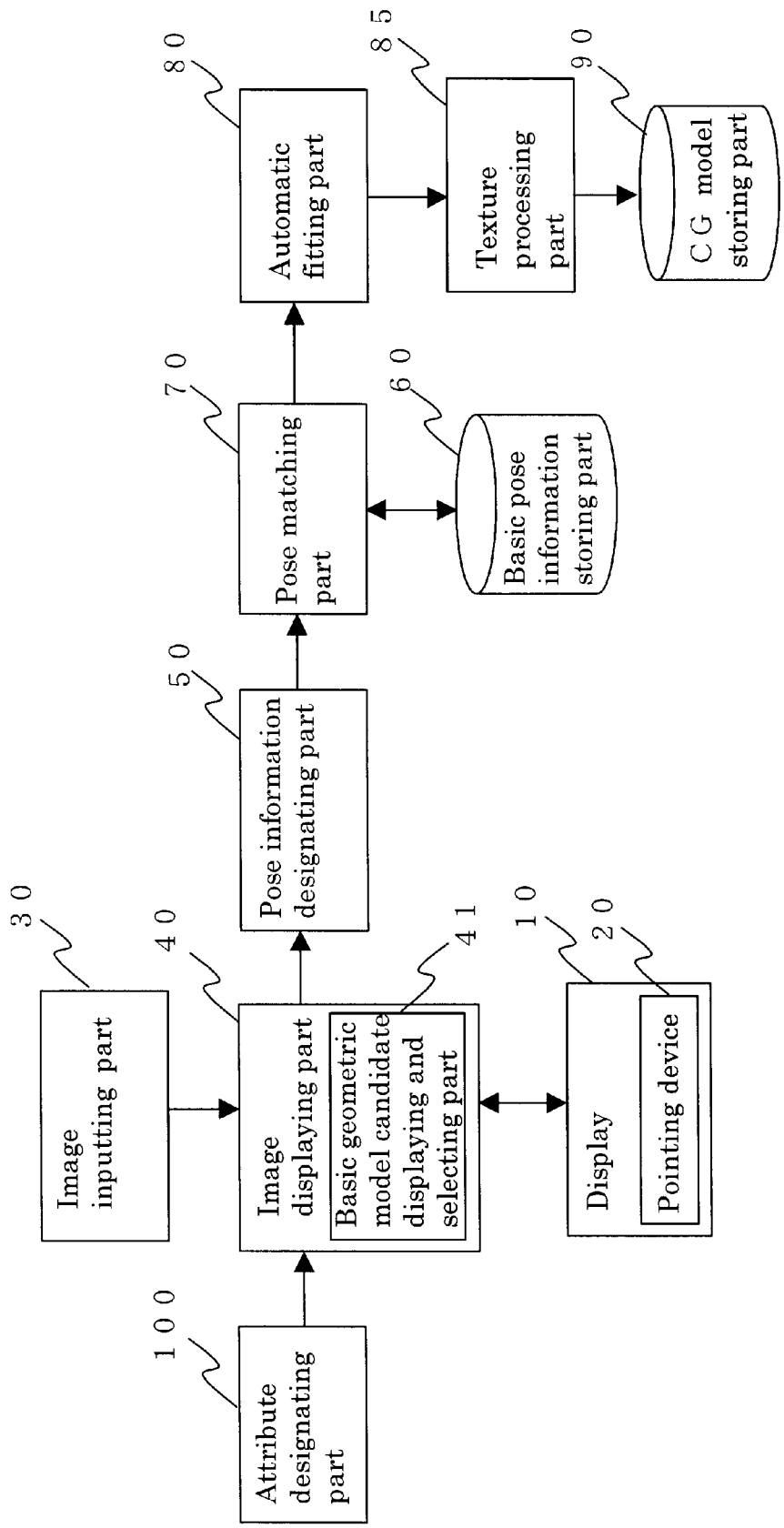
FIG. 6 is a block diagram showing a schematic apparatus configuration of Embodiment 2 of the present invention.

FIG. 6 is a block diagram showing a schematic configuration of the three-dimensional CG model generator of Embodiment 2. In FIG. 6, numeral 100 denotes an attribute designating part. The attribute designating part 100 is part to which an attribute of the object in the actually captured image is designated. For example, what the geometry is called, such as "rectangular solid" and "quadrangular pyramid", can be designated. Alternatively, a list of symbols indicating basic models is displayed so that a corresponding model can be selected from the list. As shown in the example of displaying the basic pose information of FIG. 2, the designation can be performed by pointing at the index portion with the pointing device 20.

The same components in FIG. 6 as those of FIG. 4 are assigned the same numerals and are not described in this embodiment, where appropriate.

Embodiment 3

Embodiment 3 shows an example of an apparatus configuration of the present invention. Embodiment 3 performs the pose matching process by preparing a plurality of actually captured images of an object taken from different angles.

Figure 7:
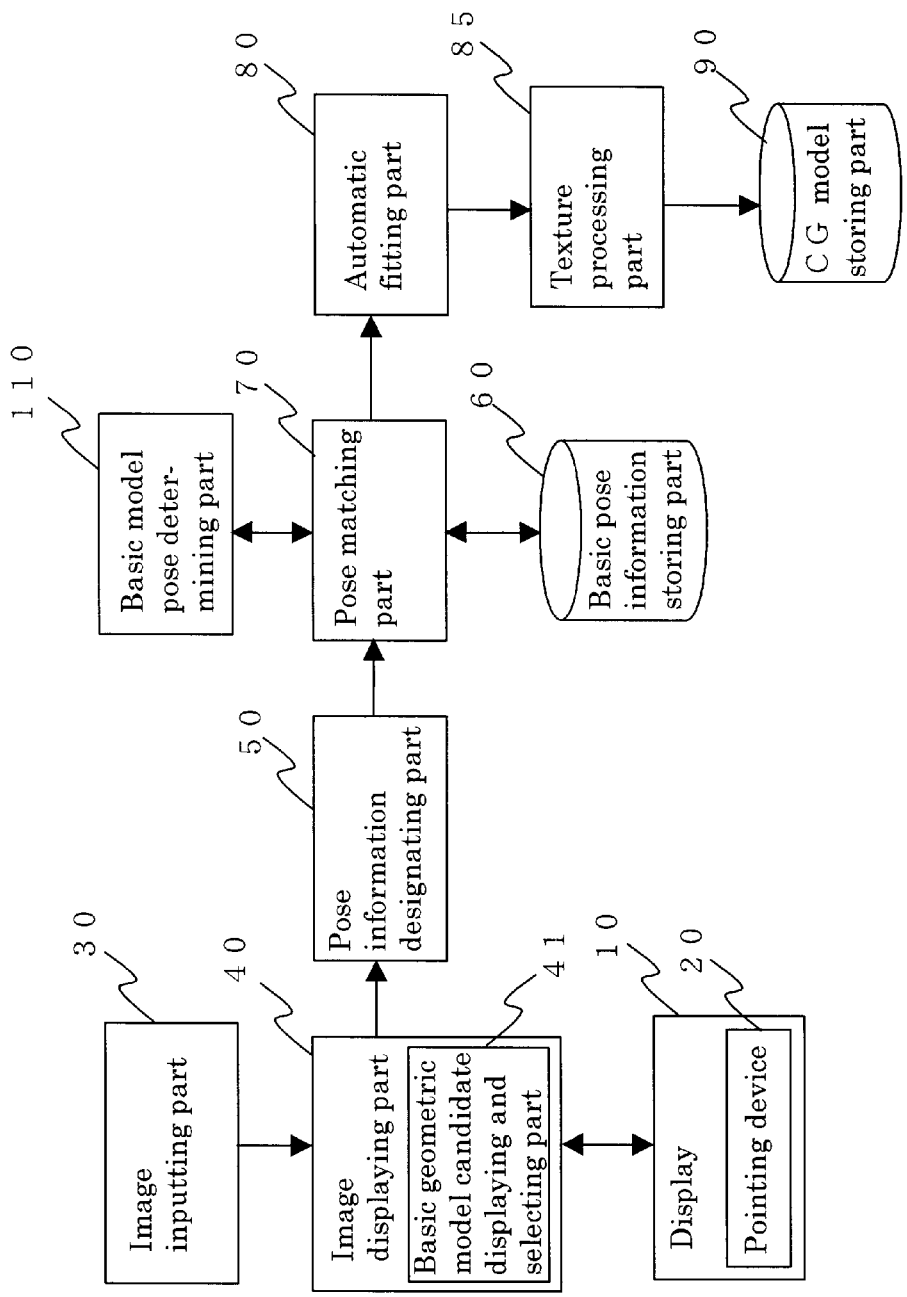
FIG. 7 is a block diagram showing a schematic apparatus configuration of Embodiment 3 of the present invention.

FIG. 7 is a block diagram showing a schematic configuration of the three-dimensional CG model generator of Embodiment 3. In FIG. 7, numeral 110 denotes a basic model and pose determining part. With respect to the plurality of actually captured images, the basic model and pose determining part 110 determines the geometry and the pose of the object in these actually captured images from the candidates of geometric models and poses determined by the pose matching part 70. More specifically, the pose matching process is performed with respect to each of the plurality of actually captured images of the same object taken from different angles. The candidates from the matching results of the plurality of poses are compared and only the result that is matched in all the images is preserved. Thus, the precision of the pose matching can be improved and the time for backtrack can be reduced. Furthermore, the vertexes are linked to the basic model in each image, and the automatic fitting is performed simultaneously with all the images. The automatic fitting with the plurality of images can improve the precision of the automatic fitting so that a more precise three-dimensional CG model can be generated.

The same components in FIG. 7 as those of FIG. 4 are assigned the same numerals and are not described in this embodiment, where appropriate.

Embodiment 3 utilizing a plurality of actually captured images allows the probability of obtaining a right result immediately without selecting a geometric model to be high.

Embodiment 4

Embodiment 4 shows an example of an apparatus configuration of the present invention. Embodiment 4 performs a matching process for a portion of a pose, namely, a partial pose matching process before matching the entire pose. In the example of the description of the basic principle, all the vertexes and edges are designated in the pose information designating part, and then the matching with the pose is performed in the pose matching part. In this embodiment, every time one edge is input, matching for the portion of the pose is performed.

Figure 8:
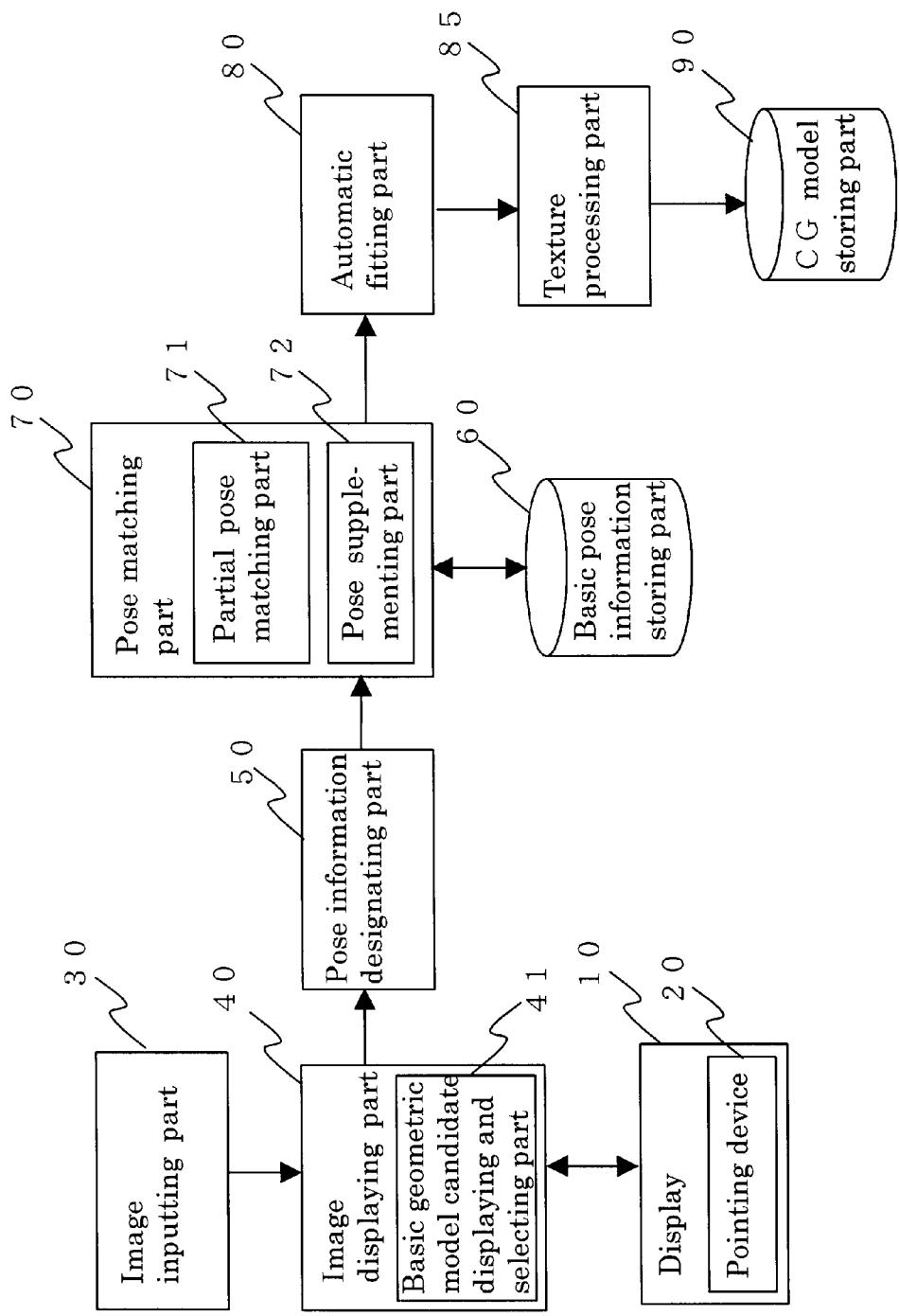
FIG. 8 is a block diagram showing a schematic apparatus configuration of Embodiment 4 of the present invention.

FIG. 8 is a block diagram showing a schematic configuration of the three-dimensional CG model generator of Embodiment 4. In FIG. 8, numeral 71 denotes a partial pose matching part, which is a subcomponent of the pose matching part 70. Numeral 72 denotes a pose supplementing part.

The same components in FIG. 8 as those of FIG. 4 are assigned the same numerals and are not described in this embodiment, where appropriate.

Figure 9:
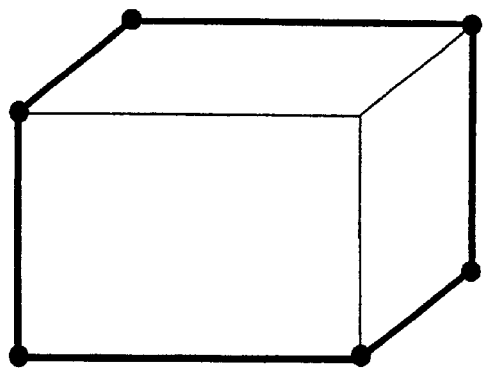
FIGS. 9(*a*) and (*b*) are diagrams showing an example in the process of designating a pose in Embodiment 4.
Figure 9:
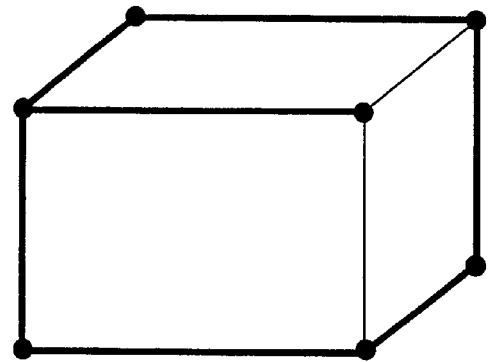

FIG. 9(a) and (b) are diagrams in the process of designating a pose. When partial matching is performed with respect to FIG. 9(a), according to the basic models shown in FIG. 2, the two poses on the right of the rectangular solid are listed as candidates, and the pose has not been specified to one yet. Next, when one more edge is designated so that the state of FIG. 9(b) is obtained, the search result limits the pose to that on the far-right of the rectangular solid. In this case, the vertexes are linked to corresponding ones by the pose supplementing part 72, a remaining edge that has not been designated yet is estimated and displayed before the user makes an input, and it is indicated that matching is completed.

Furthermore, as shown in FIG. 9(a), in the case where a few candidates are left, input work can be assisted by displaying a list of poses for selection by the user. Thus, the work efficiency can be improved by assisting the pose designation work of the user.

Figure 10:
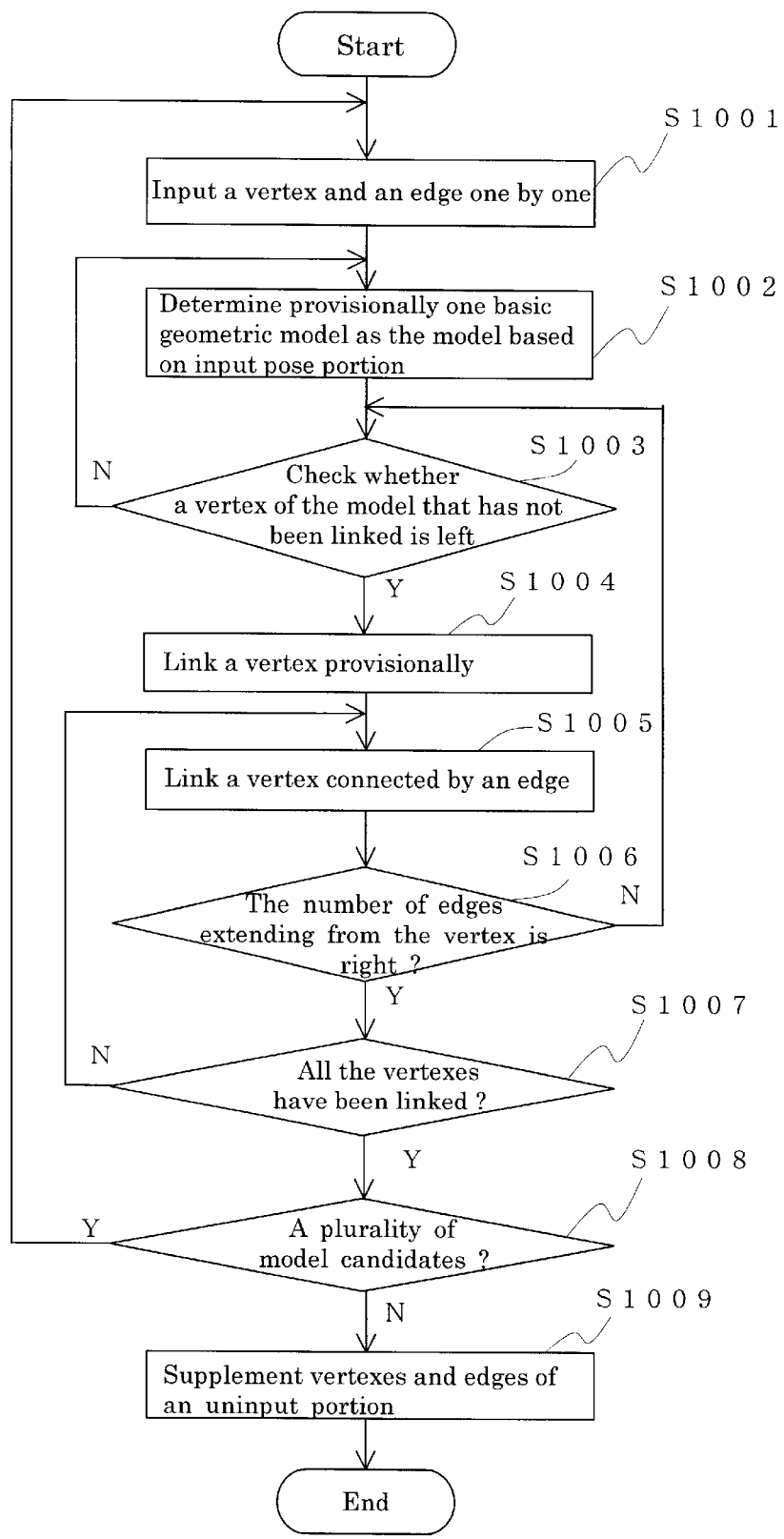
FIG. 10 is a flow chart showing the outline of the processes for a partial pose matching process of Embodiment 4.

FIG. 10 is a flow chart showing a schematic outline of the partial pose matching process of Embodiment 4.

The user designates vertexes and edges sequentially with a pointing device or the like. Every time a vertex or an edge is input (step S1001), the partial pose matching part 71 selects one basic geometric model having a corresponding number of vertexes or a corresponding number of edges from the basic pose information storing part 60 and provisionally determines it as the model, based on the portion of the pose that already has been input (step S 1002).

The processes from steps S1003 to S1007 are the same as steps S304 to S308.

In the case where the linking process for all the vertexes is completed in step S1007 (step S1007: Y), it is checked whether or not there are a plurality of candidates (step S1008). In other words, it is checked whether or not one basic geometric model is specified from the partial pose information that already has been input. In the case where there are a plurality of candidates (step S1008: Y), this means that the already input partial pose information alone does not constitute sufficient information. The procedure returns to step S1001 to receive an input for another vertex or edge. In the case where not a plurality of candidates but one candidate is specified (step S1008: N), vertexes and edges that have not been input are supplemented (step S1009) so that a three-dimensional CG model is generated. This is the end of the processes.

Embodiment 5

Embodiment 5 is an example of an apparatus configuration of the present invention. Embodiment 5 extracts basic pose information by extracting automatically all the patterns of the poses of the basic geometric model. The pose information stored in the basic pose information storing part 60 increases with an increasing number of basic geometric models. When the pose information is manually prepared, some poses may be overlooked. Therefore, the basic geometric models are input as three-dimensional CG models, and the poses thereof are generated automatically.

Figure 11:
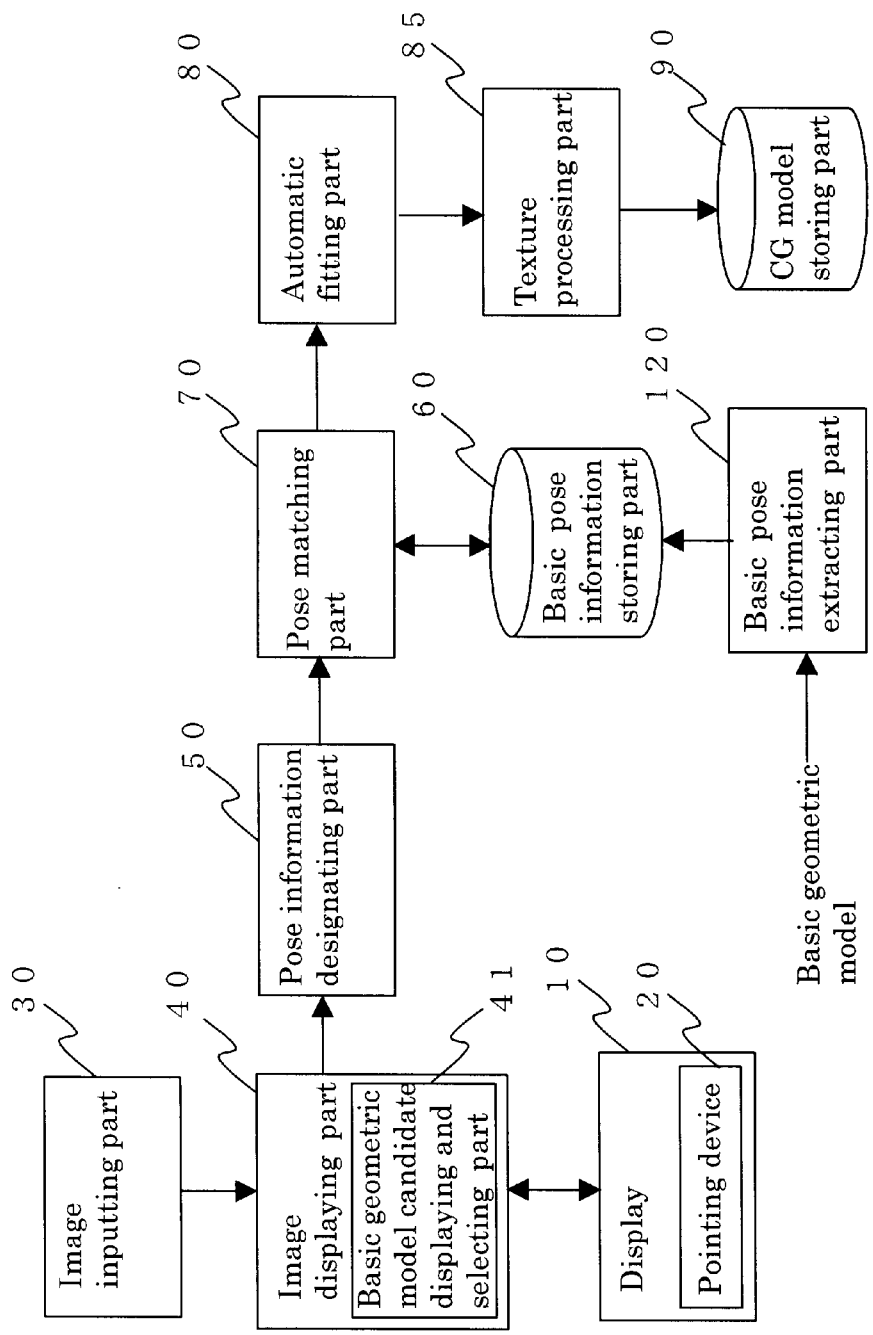
FIG. 11 is a block diagram showing a schematic apparatus configuration of Embodiment 5 of the present invention.

FIG. 11 is a block diagram showing a schematic configuration of the three-dimensional CG model generator of Embodiment 5. In FIG. 11, numeral 120 denotes a basic pose extracting part. The basic pose extracting part 120 generates an image of the basic geometric model viewed from a certain direction, and the image is used as one pose. Thereafter, the model is rotated by a small angle. In this case, when a face of the model is hidden or appears, the pose of the basic geometric model is regarded as having changed. Otherwise, since the pose has not changed, it is unnecessary to store the pose again in the basic pose information storing part 60. In this manner, only necessary poses can be extracted from the poses of the model viewed from all angles.

The same components in FIG. 11 as those of FIG. 4 are assigned the same numerals and are not described in this embodiment, where appropriate.

Embodiment 6

Embodiment 6 shows an example of an apparatus configuration of the present invention. In Embodiment 6, the pose matching part 70 and the basic pose information storing part 60 are provided with a learning function. When a new pose that has not been stored in the basic pose information storing part 60 yet is found in the pose matching process, the pose matching part 70 instructs the basic pose information storing part 60 to resister or store information on the new pose in the basic pose information storing part 60.

Embodiment 7

Embodiment 7 shows an example of an apparatus configuration of the present invention. Embodiment 7 utilizes history information of pose matching.

Figure 12:
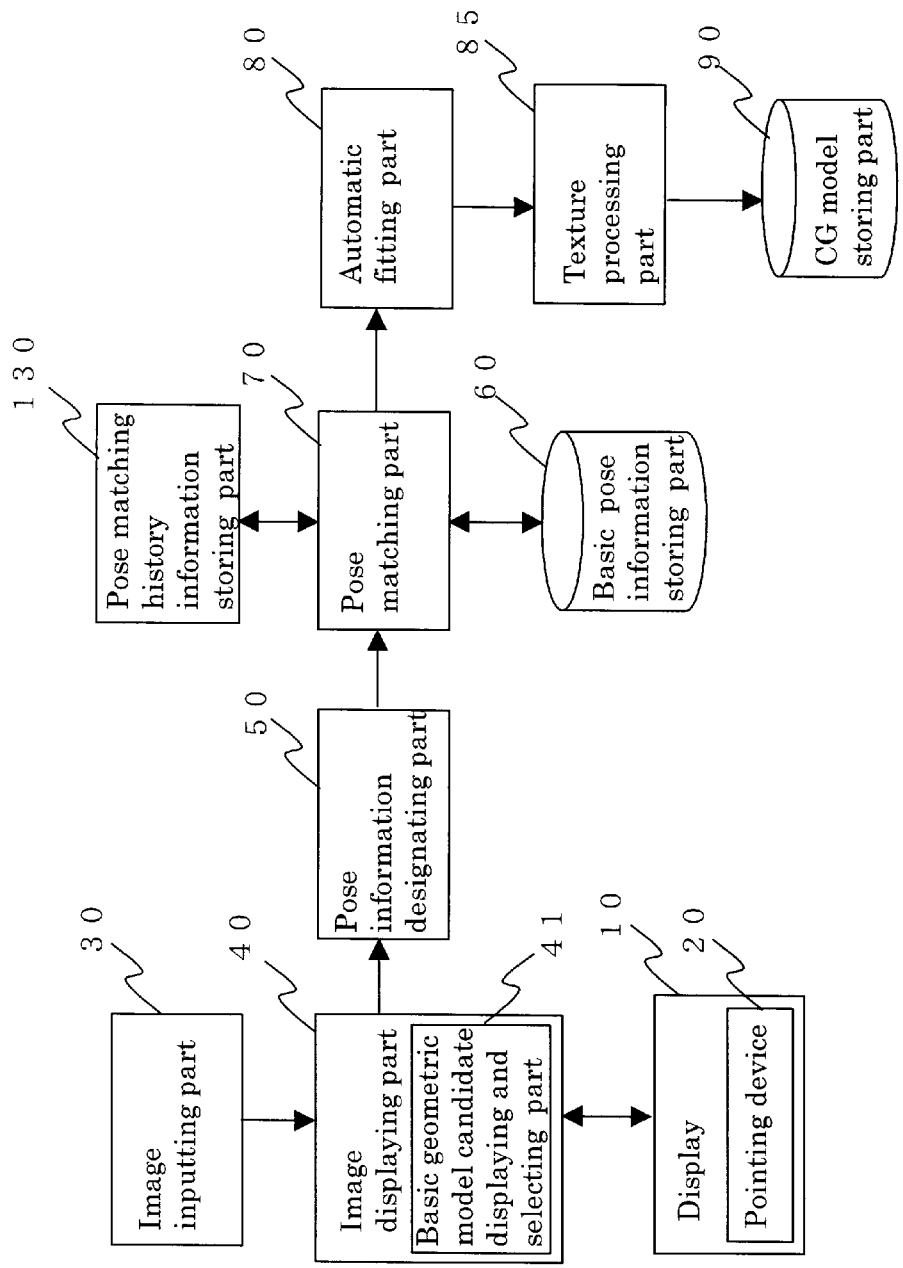
FIG. 12 is a block diagram showing a schematic apparatus configuration of Embodiment 7 of the present invention.

FIG. 12 is a block diagram showing a schematic configuration of the three-dimensional CG model generator of Embodiment 7. In FIG. 12, numeral 130 is a pose matching history information storing part. The pose matching history information storing part 130 is prepared so that the results from pose matching are stored as history information. When a plurality of basic geometric models or poses are hit in pose matching and a plurality of candidates are displayed on the display 10, the candidates with priorities assigned by utilizing the history information of the past pose matching recorded in the pose matching history information storing part 130 can be presented to the user.

Embodiment 8

Figure 13:
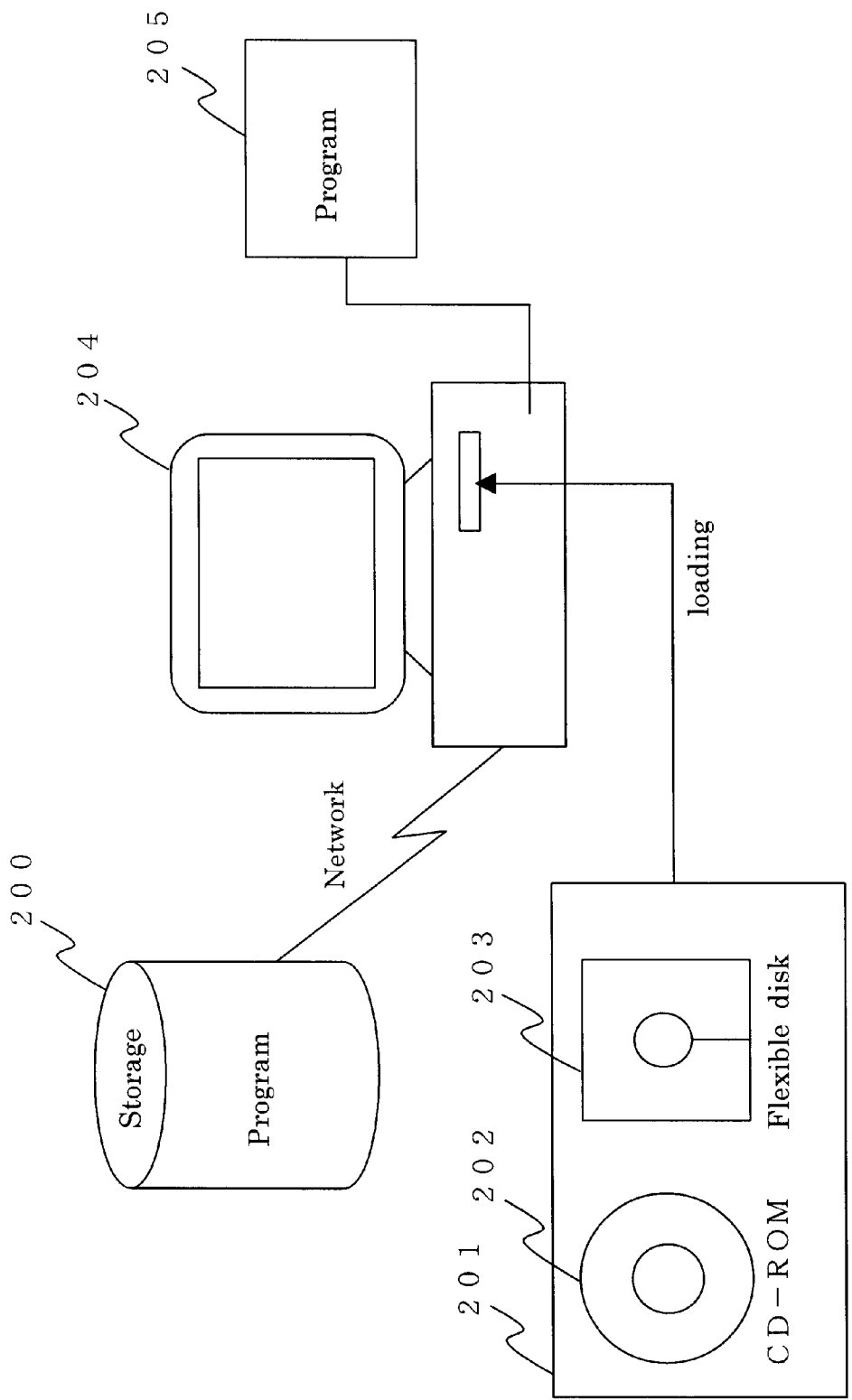
FIG. 13 is a diagram showing a recording medium of Embodiment 8 of the present invention.

The three-dimensional CG model generator of the present invention can be realized on various computers by recording a program storing the processes for realizing the above-described embodiments on a computer-readable recording medium. The recording medium in which the program for realizing the three-dimensional CG model generator of the present invention are recorded can be not only a transportable recording medium 201 such as a CD-ROM 202 or a flexible disk 203, but also a recording medium 200 in a recording device on a network or a recording medium 205 such as a hard disk and a RAM of a computer, as shown in FIG. 13. When executing the program, the program is loaded into a computer 204 and executed in its main memory.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A three-dimensional CG model generator for generating a three-dimensional CG model of a three-dimensional object represented in a two-dimensional image, based on information from the two-dimensional image representing the three-dimensional object supplied thereto, comprising:
    an image inputting part for receiving image data of the object taken from a certain viewpoint;
    a basic pose information storing part of storing pose information on all patterns of a basic geometric model as basic pose information, the pose information indicating a pose with relationships of vertexes and edges of the image projected two-dimensionally;
    a pose information designating part for acquiring the pose information be designating a vertex and an edge of the object represented in the supplied image projected two-dimensionally;
    a pose matching part for performing pose matching be comparing the pose information acquired by the pose information designating part and the basic pose information stored in the basic pose information storing part, and specifying a basic geometric model having corresponding pose information and a corresponding pose; and
    an automatic fitting part for deforming and adjusting the pose of the basic geometric model specified by the pose matching part so as to conform to the pose of the supplied image;
    wherein the three-dimensional CG model of the object is generated based on the pose information of the supplied image.

2. The three-dimensional CG model generator according to claim 1, comprising a basic geometric model candidate displaying and selecting part for presenting a plurality of basic geometric models to a user as candidates for selection by the user, when as a result of the pose matching, the plurality of basic geometric models are obtained as those having corresponding pose information.

3. The three-dimensional CG model generator according to claim 2, comprising a pose matching history information storing part for storing history information of results of past pose matching,
    wherein the basic geometric model candidate displaying and selecting part displays the plurality of candidates with priorities that are assigned based on the pose matching history information when the plurality of candidates are displayed.

4. The three-dimensional CG model generator according to claim 1, comprising an attribute designating part for designating an attribute of the object represented in the supplied image,
    wherein the pose matching part limits the basic pose information stored in the basic pose information storing part based on the designated attribute before performing the pose matching.

5. The three-dimensional CG model generator according to claim 1, wherein a plurality of images of the object from which a three-dimensional CG model is generated are supplied, and the pose matching part performs pose matching with respect to each of the images, and a basic geometric model of the object is determined from results of the plurality of pose matching.

6. The three-dimensional CG model generator according to claim 1, wherein
    in a process of designating vertexes and edges of the supplied image sequentially by inputting the vertexes and the edges from the pose information designating part, the pose matching part comprises:
        a partial pose matching part for finding a match between information on a portion of a pose of the basic geometric model stored in the basic pose information storing part and information based on a portion of a pose that is constituted by the designated and input vertexes and edges; and a basic geometric model candidate displaying and selecting part for presenting a corresponding basic geometric model obtained as a result of the partial pose matching by the partial pose matching part, wherein the results of the partial pose matching are updated and presented in response to information on a vertex and an edge of the supplied image being input from the pose information designating part.

7. The three-dimensional CG model generator according to claim 6, wherein the pose matching part comprises a basic geometric model selecting part for selecting one basic geometric model from candidates presented by the basic geometric model candidate displaying and selecting part, thereby assisting pose designation of a user.

8. The three-dimensional CG model generator according to claim 1, comprising a basic pose extracting part for receiving a three-dimensional CG model as a basic geometric model, generating a two-dimensional image of the basic geometric model which is a projected image from one viewpoint, extracting pose information from the generated two-dimensional image, changing the viewpoint, repeating the extraction of the pose information so that all patterns of poses that the basic geometric model can take are extracted.

9. The three-dimensional CG model generator according to claim 1, wherein when the pose information input from the pose information designating part with respect to the supplied image is not stored in the pose information storing part, the input pose information is registered and stored in the pose information storing part as pose information of a basic geometric model.

10. A computer-readable recording medium storing a program for realizing a three-dimensional CG model generator for generating a three-dimensional CG model of a three-dimensional object represented in a two-dimensional image, based on information from the two-dimensional image representing the three-dimensional object supplied thereto, the program comprising:

a basic pose information storing processing step for storing pose information on all patterns of a basic geometric model as basic pose information, the pose information indicating a pose with relationships of vertexes and edges of the image projected two-dimensionally taken from a certain viewpoint;

a pose information designating processing step for acquiring the pose information by designating a vertex and an edge of the object represented in the supplied image projected two-dimensionally;

a pose matching processing step for performing pose matching by comparing the pose information acquired by the pose information designating processing step and the basic pose information stored in the basic pose information storing processing step, and specifying a basic geometric model having corresponding pose information and a corresponding pose; and an automatic fitting processing step for deforming and adjusting the pose of the basic geometric model specified by the pose matching processing step so as to conform to the pose of the supplied image.

\* \* \* \* \*